(12) United States Patent
Asprion et al.

(10) Patent No.: US 7,749,309 B2
(45) Date of Patent: Jul. 6, 2010

(54) METHOD FOR DEACIDIFYING A FLUID STREAM AND WASHING LIQUID USED IN SUCH A METHOD

(75) Inventors: Norbert Asprion, Ludwigshafen (DE); Christoph Grossmann, The Woodlands, TX (US)

(73) Assignee: BASF Aktiengesellschaft, Ludwigshafen (DE)

( * ) Notice: Subject to any disclaimer, the term of this patent is extended or adjusted under 35 U.S.C. 154(b) by 287 days.

(21) Appl. No.: 10/505,721

(22) PCT Filed: Mar. 4, 2003

(86) PCT No.: PCT/EP03/02187

§ 371 (c)(1), (2), (4) Date: Aug. 27, 2004

(87) PCT Pub. No.: WO03/076049

PCT Pub. Date: Sep. 18, 2003

(65) Prior Publication Data

US 2006/0162559 A1    Jul. 27, 2006

(30) Foreign Application Priority Data

Mar. 12, 2002    (DE) .............................. 102 10 729

(51) Int. Cl.
*B01D 53/14* (2006.01)
(52) U.S. Cl. .............................. 95/169; 95/177; 95/181; 95/183; 95/199; 95/235; 95/236; 423/228; 423/229

(58) Field of Classification Search .................. 95/235, 95/236, 187, 179, 172, 177, 159, 169, 199, 95/181, 183; 423/228–229
See application file for complete search history.

(56) References Cited

U.S. PATENT DOCUMENTS

| 4,240,922 | A | * | 12/1980 | Sartori et al. ............... 252/189 |
| 5,618,506 | A | * | 4/1997 | Suzuki et al. ............... 423/228 |
| 6,740,230 | B1 | * | 5/2004 | Hugo et al. .................. 208/237 |
| 7,004,997 | B2 | * | 2/2006 | Asprion et al. ............... 95/235 |

FOREIGN PATENT DOCUMENTS

| EP | 0 647 462 | 4/1995 |
| EP | 0 879 631 | 11/1998 |
| WO | WO 01/05488 A1 * | 1/2001 |

* cited by examiner

*Primary Examiner*—Duane Smith
*Assistant Examiner*—Ives Wu
(74) *Attorney, Agent, or Firm*—Oblon, Spivak, McClelland, Maier & Neustadt, L.L.P.

(57) ABSTRACT

Disclosed is a method for deacidifying a fluid stream containing acidic gases as contaminants, according to which the fluid stream is brought into intimate contact with a washing liquid in at least one absorption step. Said washing liquid represents an aqueous solution containing a) tertiary aliphatic alkanolamines (alkanolamine A), at least 30 percent by weight of said tertiary aliphatic alkanolamines being 3-dimethylamino-1-propanol, and b) secondary aliphatic amines (activator B), at least 20 percent by weight of said secondary aliphatic amines being piperazin. The fluid stream which has been essentially purified of the acidic gases is then separated from the washing liquid that is loaded with acidic gases.

15 Claims, 2 Drawing Sheets

METHOD FOR DEACIDIFYING A FLUID STREAM AND WASHING LIQUID USED IN SUCH A METHOD

A process for deacidifying a fluid stream containing acid gases as impurities, which comprises bringing the fluid stream into intimate contact with a scrubbing liquid in at least one absorption step, where the scrubbing liquid is an aqueous solution comprising
a) tertiary aliphatic alkanolamines (alkanolamine A), where at least 30% by weight of the tertiary aliphatic alkanolamines is 3-dimethylamino-1-propanol and
b) secondary aliphatic amines (activator B), where at least 20% by weight of the secondary aliphatic amines is piperazine, and the fluid stream substantially freed from the acid gases and the scrubbing liquid laden with acid gases are separated from one another.

The present invention relates to a process for deacidifying a fluid stream containing acid gases as impurities, and to a scrubbing liquid or absorption liquid for use in such a process.

In numerous processes in the chemical industry, fluid streams occur containing acid gases, for example $CO_2$, $H_2S$, $SO_2$, $CS_2$, HCN, COS or mercaptans as impurities. These fluid streams can be, for example, gas streams (such as natural gas, synthesis gas or heavy oil or heavy residues, refinery gas, or reaction gases resulting from the partial oxidation of organic materials, for example coal or petroleum) or liquid or liquefied hydrocarbon streams (such as LPG (liquefied petroleum gas) or NGL (natural gas liquids)).

Before these fluids can be transported or further processed, the acid gas content of the fluid must be significantly decreased. $CO_2$ must be removed from natural gas, for example, since a high $CO_2$ concentration decreases the heating value of the gas. In addition, $CO_2$, in combination with water frequently entrained in the fluid streams can lead to corrosion on pipelines and fittings.

Removing sulfur compounds from these fluid streams is of particular importance for various reasons. For example, the content of sulfur compounds of natural gas must be reduced by suitable treatment measures directly at the natural gas source, since the sulfur compounds also form acids in the water frequently entrained by the natural gas, which acids are corrosive. Therefore, to transport the natural gas in a pipeline, preset limit values of the sulfur-containing impurities must be complied with. Furthermore, numerous sulfur compounds are foul-smelling, even at low concentrations, and, particularly hydrogen sulfide ($H_2S$), are toxic.

Numerous processes have therefore already been developed for removing acid gas constituents from fluid streams such as hydrocarbon gases, LPG or NGL. In the most widespread processes, the fluid mixture containing the acid gases is brought into contact with an organic solvent or an aqueous solution of an organic solvent in a gas scrubber or a liquid/liquid extraction stage.

Such gas scrubbing processes and corresponding scrubbing solutions used in these processes are also the subject of extensive patent literature. In principle here a distinction can be made between two different types of absorption media or solvents for gas scrubbing.

Firstly, what are termed physical solvents are used in which, after absorption has been completed, the dissolved acid gases are present in molecular form. Typical physical solvents are cyclotetramethylene sulfone (sulfolane) and derivatives thereof, aliphatic acid amides, NMP (N-methylpyrrolidone), N-alkylated pyrrolidones and corresponding piperidones, methanol and mixtures of dialkyl ethers of polyethylene glycols (Selexol®, Union Carbide, Danbury, Conn., USA).

Secondly, chemical solvents are used whose mode of action is based on chemical reactants in which, after absorption has been completed, the dissolved acid gases are present in the form of chemical compounds. For example, in the case of the aqueous solutions of inorganic bases (for example potash solution in the Benfield process) or organic bases (for example alkanolamines) which are most frequently used as chemical solvents on an industrial scale, ions are formed when acid gases are dissolved. The solvent can be regenerated by expansion to a lower pressure or by stripping, the ionic species reacting back to form acid gases and/or being stripped off by steam. After the regeneration process, the solvent can be reused. Preferred alkanolamines used in the removal of acid gas impurities from hydrocarbon gas streams comprise monoethanolamine (MEA), diethanolamine (DEA), triethanolamine (TEA), diethylethanolamine (DEEA), diisopropylamine (DIPA), aminoethoxyethanol (AEE) and ethyldiethanolamine (MDEA).

Primary and secondary alkanolamines are suitable, in particular, for gas scrubbers where the purified gas must have a very low $CO_2$ content (for example 10 $ppm_v$ of $CO_2$). The nitrogen of the primary and secondary alkanolamines reacts directly with carbon dioxide to form soluble carbamate. In the aqueous amine solution the carbamate is in a characteristic equilibrium with bicarbonate. To regenerate the amine solution, in industrial use, a two-stage regeneration process is frequently used, in which the laden solvent is firstly expanded in one or more flash columns, so that a portion of the absorbed $CO_2$ evaporates from the solution. Residual carbon dioxide, with or without other absorbed acid gases, are then removed by steam stripping. However, solvents which contain primary and secondary alkanolamines require a greater amount of steam to decompose the carbamate than do tertiary amines and correspondingly a large amount of thermal energy; therefore, tertiary amines are frequently used.

European patent application EP-A 0 322 924 discloses using an aqueous amine solution containing tertiary alkanolamines, in particular MDEA, for deacidifying gas streams. In contrast to primary and secondary alkanolamiens, tertiary alkanolamines do not react directly with carbon dioxide, since the amine is completely substituted. Instead, carbon dioxide is reacted with the tertiary alkanolamine and with water to form bicarbonate in a reaction having a low reaction rate. Since there is no direct bond between tertiary alkanolamines and carbon dioxide, the amine solution can be regenerated very economically. In many cases, flash regeneration with one or more expansion stages is sufficient. An optional additional thermal regeneration requires significantly less energy than in the case of solutions of primary or secondary alkanolamines. Tertiary amines are suitable, in particular for selective removal of $H_2S$ from gas mixtures containing $H_2S$ and $CO_2$.

However, a disadvantage of the use of tertiary alkanolamine solutions is that, because of the low reaction rate of the carbon dioxide, the scrubbing process must be carried out with a high residence time. The absorption and desorption columns required are therefore very high compared with systems in which either primary or secondary alkanolamines are used. Therefore, attempts have been made to increase the absorption rate of carbon dioxide in aqueous solutions of tertiary alkanolamines by adding further compounds which are termed activators or promoters.

German patent application DE-A-1 542 415 proposes increasing the activity both of physical solvents and chemical solvents by adding monoalkylalkanolamines or morpholine and derivatives thereof. EP-A-0 160 203 mentions monoethanolamine as activator. German patent application DE-A-1 904 428 describes the addition of monomethylethanolamine (MMEA) as accelerator to improve the absorption properties of an MDEA solution.

U.S. Pat. No. 4,336,233 describes one of the currently most effective scrubbing liquids for removing $CO_2$ and $H_2S$ from a gas stream. This is an aqueous solution of methyldiethanolamine (MDEA) and piperazine as absorption accelerator or activator (aMDEA®, BASF AG, Ludwigshafen). The scrubbing liquid described there comprises from 1.5 to 4.5 mol/l of methyldiethanolamine (MDEA) and from 0.05 to 0.8 mol/l, preferably up to 0.4 mol/l, of piperazine. Removing $CO_2$ and $H_2S$ with the use of MDEA is further described in more detail in the following applicant's patents: U.S. Pat. No. 4,551,158; U.S. Pat. No. 4,553,984; U.S. Pat. No. 4,537,753; U.S. Pat. No. 4,999,031; CA 1 291 321 and CA 1 295 810.

International patent application WO 89/11327 discloses an absorption liquid or scrubbing liquid which consists of an aqueous amine solution containing tertiary amines, and small amounts of polyamines, for example aliphatic diamines, as activator.

EP-A-672 446 describes absorption liquids for acid gas scrubbing which may, inter alia, also comprise DMAP.

EP-A-879 631 describes a process for removing carbon dioxide from gas streams. As scrubbing solution, aqueous mixtures are proposed which, as amine component, comprise a combination of secondary amines and tertiary amines. In the form of a list-type description, as secondary amine, inter alia, piperazine is also mentioned, and, as alkanolamine, inter alia, 3-dimethylamino-1-propanol (DMAP or DIMAP) is also mentioned.

It is an object of the present invention to specify an improved process for deacidifying a fluid stream containing acid gases as impurities by gas scrubbing, in which acid gases such as $CO_2$, $H_2S$, COS, $CS_2$ or mercaptans can be effectively removed from the fluid stream and the absorption capacity of the scrubbing liquid for acid gases is improved compared with the known processes at relatively high overall pressures (>2 bar, preferably >5 bar).

We have found that this object is achieved by the process as claimed in the present claim 1.

The present invention therefore relates to a process for deacidifying a fluid stream containing acid gases, such as $CO_2$, $H_2S$, COS, $CS_2$ or mercaptans, as impurities, which comprises bringing the fluid stream, in at least one absorption step, into intimate contact with a scrubbing liquid which comprises water, 3-dimethylamino-1-propanol (DMAP) and piperazine. The acid gases are removed from the fluid stream and absorbed by the scrubbing liquid. The fluid-stream substantially freed from acid gases and the scrubbing liquid laden with acid gases are then separated from one another. Surprisingly, it has been found that using 3-dimethylamino-1-propanol significantly increases the absorption capacity of the scrubbing liquid compared with known scrubbing liquids.

The present invention therefore relates in the most general form to the use of aqueous scrubbing solutions containing 3-dimethylamino-1-propanol and piperazine for removing acid gases from an acid-gas-containing fluid stream at total pressures from 2 bar.

The present invention also relates to an absorption liquid or scrubbing liquid containing water, 3-dimethylamino-1-propanol and piperazine which is suitable, in particular, for use in the inventive process.

The sum of the concentrations of all tertiary aliphatic alkanolamines present in the scrubbing solution is advantageously in the range from −10 to 60% by weight. Preferably, the alkanolamine concentration is from 20 to 60% by weight, and particularly preferably from 30 to 60% by weight. The concentration of all activators B present in the scrubbing solution is advantageously from 0.1 to 50% by weight, preferably from 0.1 to 40% by weight, and particularly preferably from 0.1 to 30% by weight.

The proportion of DMAP of the alkanolamines A is preferably from 30 to 100% by weight, and particularly preferably from 50 to 100% by weight. Very particularly preferably, exclusively DMAP is used as alkanolamine A.

The proportion of piperazine of the activators B is preferably from 20 to 100% by weight, and particularly preferably from 40 to 100% by weight. Very particularly preferably, piperazine is used exclusively as activator B.

These figures relate to the scrubbing liquid ready for use. The inventive scrubbing liquid is usually prepared as a concentrate which is diluted by the user to the final concentration by adding water.

The alkanolamines A which may be present in the scrubbing solution in addition to DMAP, can be conventional alkanolamines proven in gas or LPG scrubbing, as are described, for example, in WO 89/11327. Particularly preferably, at all events, triethanolamine (TEA) and methyldiethanolamine (MDEA) are used. The use of MDEA is preferred, in particular, for amine scrubbing of hydrocarbon gases, such as natural gas, while the use of TEA can be advantageous in LPG scrubbing. Thus, for example, U.S. Pat. No. 5,877,386 describes that TEA-containing amine solutions have a lower solubility in LPG, which decreases the amine losses in the scrubbing process.

The activators B which can be present in the scrubbing solution in addition to DMAP may be, for example, 3-methylamino-1-propylamine or homopiperazine.

The inventive scrubbing liquid may also contain small amounts of a physical absorption medium or solvent for acid gases, for example sulfolane, aliphatic acid amides, N-methylpyrolidone or methanol. Generally, these amounts are no more than 20%, based on the scrubbing solution.

The inventive scrubbing solution also permits a substantial removal of $H_2S$ from the gas stream. COS and mercaptans can also be at least partially removed.

The inventive process can be carried out using conventional scrubbing apparatuses used in gas scrubbing or LPG scrubbing. Suitable scrubbing apparatuses which ensure, in an absorption zone, intimate contact between the fluid stream and the scrubbing liquid are, for example, packed columns with random or structured packings, tray columns, radial flow scrubbers, jet scrubbers, Venturi scrubbers and rotary spray scrubbers, preferably packed columns containing random or structured packings and tray columns.

In the absorption column, the scrubbing liquid typically has a temperature of from 40 to 70° C. at the column top and from 50 to 100° C. at the column bottom. The total pressure in the column is generally from 1 to 120 bar. Advantageously, the inventive process is carried out in the absorption step at 2 bar or at a higher pressure, preferably at 5 bar or at a higher pressure, particularly preferably at from 10 to 100 bar.

The inventive process can be carried out in one step or in a plurality of sequential substeps. In the latter case, the fluid stream containing the acid gas constituents is brought into intimate contact in each substep in each case with a substream of the scrubbing liquid. For example, at different points of the absorption zone a substream of the absorption medium can be fed, in which case, for instance when an absorption column is used, the temperature of the scrubbing liquid fed generally decreases in sequential substeps from the bottom to the top of the column.

The scrubbing liquid laden with acid gas constituents and the purified gas are separated from one another and removed from the absorption zone. The scrubbing liquid can then be regenerated and then recirculated with reduced loading to the absorption zone. Typically, in the regeneration, a pressure expansion of the laden scrubbing liquid is carried out from a higher pressure prevailing in the absorption zone to a lower pressure. The pressure expansion can proceed, for example, via a throttle valve. Supplementary, or alternatively thereto, the scrubbing liquid can be passed via an expansion turbine by which a generator can be driven and electrical energy can be produced. The energy thus removed from the scrubbing liquid during expansion may also be used, for example, for driving liquid pumps in the scrubbing liquid circuit.

The acid gas constituents can be released, during regeneration of the scrubbing liquid, for example in an expansion column, for example a vertical or horizontal flash vessel or a countercurrent flow column equipped with internals. A plurality of expansion columns can be connected one after the other, in which regeneration is carried out at different pressures. For example, the scrubbing liquid can first be regenerated in a preliminary expansion column at high pressure, which is, for example, approximately 1.5 bar above the partial pressure of the acid gas constituents in the absorption zone and then can be regenerated in a main expansion column at low pressure, for example at from 1 to 2 bar absolute. In the case of a multistage expansion process, in the first expansion column preferably inert gases are released, such as absorbed components of the gas to be purified, and in the subsequent expansion columns the acid gas constituents are released.

By means of stripping with an inert fluid, which is also preferably provided, further acid gases can be removed from the scrubbing liquid during the regeneration. For this the scrubbing liquid and a stripping medium, advantageously a hot inert gas, nitrogen or steam being preferred, are passed in countercurrent through a desorption column fitted with random packings, structured packings or trays. Preferably the pressure during stripping is from 1 to 3 bar absolute and the temperature from 90 to 130° C.

Regeneration of the scrubbing liquid in a plurality of successive substeps, the loading of the scrubbing liquid with acid gas constituents decreasing with each substep, is described in U.S. Pat. No. 4,336,233, for example. A coarse scrubbing with pure expansion circuit without stripping is then carried out, the laden scrubbing liquid being expanded via an expansion turbine and regenerated stepwise in a preliminary expansion column and a main expansion column. This variant is used especially when the acid gases to be scrubbed out have high partial pressures and high requirements are not made as to the purity of the clean gas.

In a further preferred embodiment of the inventive process the scrubbing liquid substreams used in sequential substeps of the scrubbing or absorption process are obtainable via sequential substeps of the regeneration process and have a decreasing loading with acid gas constituents. Preference is given here to a process, in particular, in which the feed gas or LPG containing the acid gas constituents is successively brought into intimate contact with a first substream of the scrubbing liquid which is obtained after partial regeneration in an expansion column and before the stripping, and a second substream of the scrubbing liquid which is obtained after the stripping.

For example, as described in U.S. Pat. No. 4,336,233, the absorption step can be carried out in two substeps, a coarse scrubbing and a fine scrubbing, and the regeneration step can be carried out stepwise by pressure expansion in an expansion turbine, a preliminary expansion column and a main expansion column, and via subsequent stripping. In this case the scrubbing liquid substream for the coarse scrubbing can originate from the main expansion column and the substream for the fine scrubbing can originate from the stripping.

The regenerated absorption medium is usually, before being fed into the absorption zone, passed through a heat exchanger and brought to the temperature required for the scrubbing operation. For example, heat can be withdrawn from the regenerated scrubbing liquid leaving the stripping column and fed to the scrubbing liquid still containing acid gas constituents before its entry into the stripping column.

The inventive process can be carried out with typical plant configurations used for gas scrubbing and subsequent regeneration of the scrubbing liquid, as are described, for example, in U.S. Pat. No. 4,336,233 for a single-stage and two-stage scrubbing process and particularly extensively in EP-A 0 322 924 for a single-stage scrubbing process with an expansion and stripping step. Both documents are explicitly incorporated herein by reference.

The inventive reference is described in more detail below with reference to the accompanying drawing.

In the drawings

Figure 1:
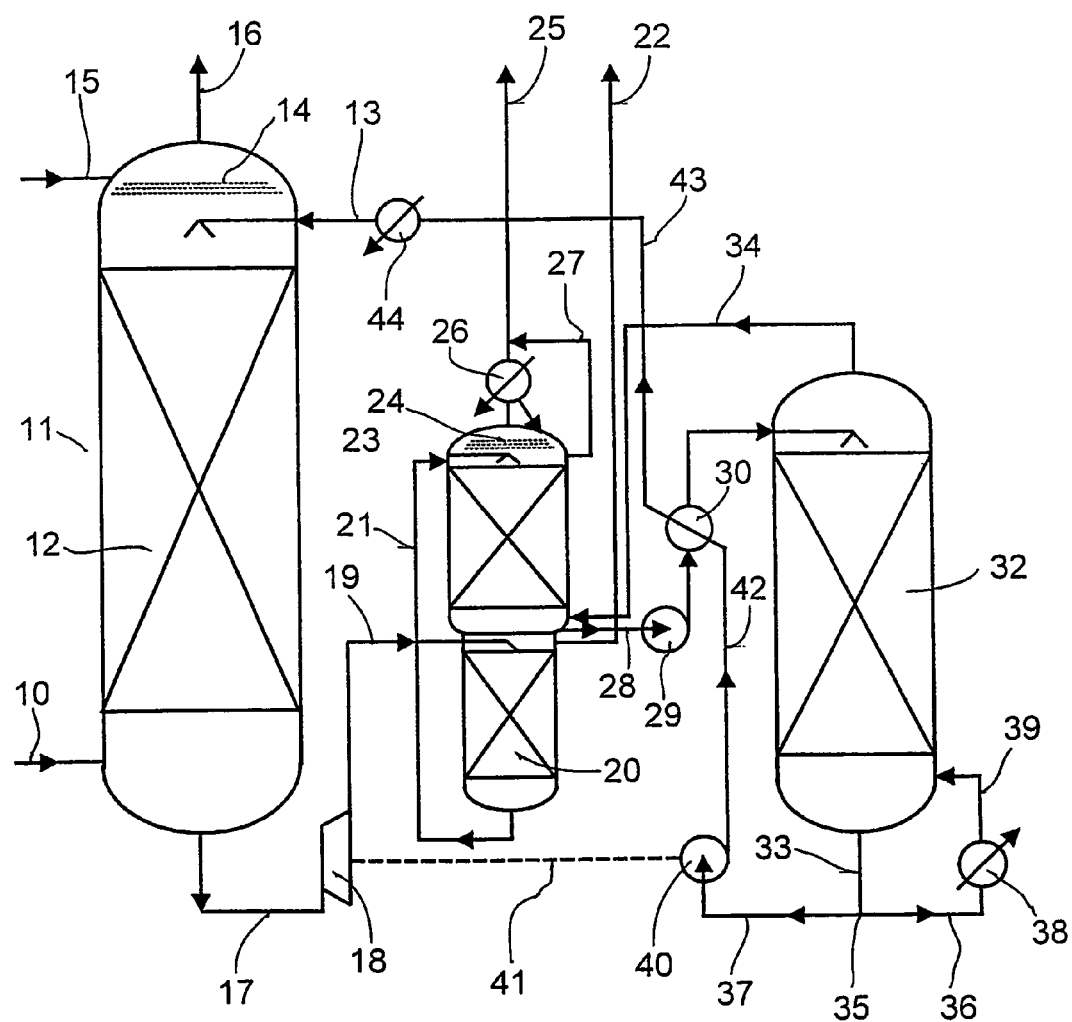
FIG. 1 shows a diagrammatic representation of a plant for carrying out the inventive process in a single-stage scrubbing process which is followed by regeneration of the scrubbing liquid using expansion and stripping columns.

With reference to FIG. 1, a preferred arrangement is shown for carrying out the inventive process as used, for example, for removing acid gases from a natural gas stream containing $CO_2$ and other acid gases.

The fluid mixture which can contain natural gas, for example, as product of value and furthermore comprises acid gases such as $H_2S$, $CO_2$ and COS, is passsed via a feed line 10 into an absorption column 11. Before entry into the absorption column, separation devices (which are not shown) can be provided which remove liquid droplets, for example, from the raw gas. The absorption column 11 has an absorption zone 12 in which intimate contact is ensured between the acid raw gas and a scrubbing liquid low in acid gases which passes via a feed line 13 into the top region of the absorption column 11 and is fed in countercurrent to the gas to be treated. The absorption region 12 can be implemented, for example, by trays, for example sieve trays or bubble-cap trays, or by structured packings. Typically, from 20 to 34 trays are used. In the top region of the absorption column 11, back-wash trays 14 can be disposed in order to decrease the loss of highly volatile constituents of the scrubbing liquid. The back-wash trays 14 which are constructed, for example, as bubble-cap trays, are fed via a condensate line 15 with water through which the treated gas is passed.

The natural gas stream which is substantially freed from acid gas constituents leaves the absorption column 11 via an overhead takeoff 16. A separator (which is not shown) which removes entrained scrubbing liquid from the gas stream can be disposed in the line 16, in particular when back-wash trays are not provided in the column 11.

Figure 2:
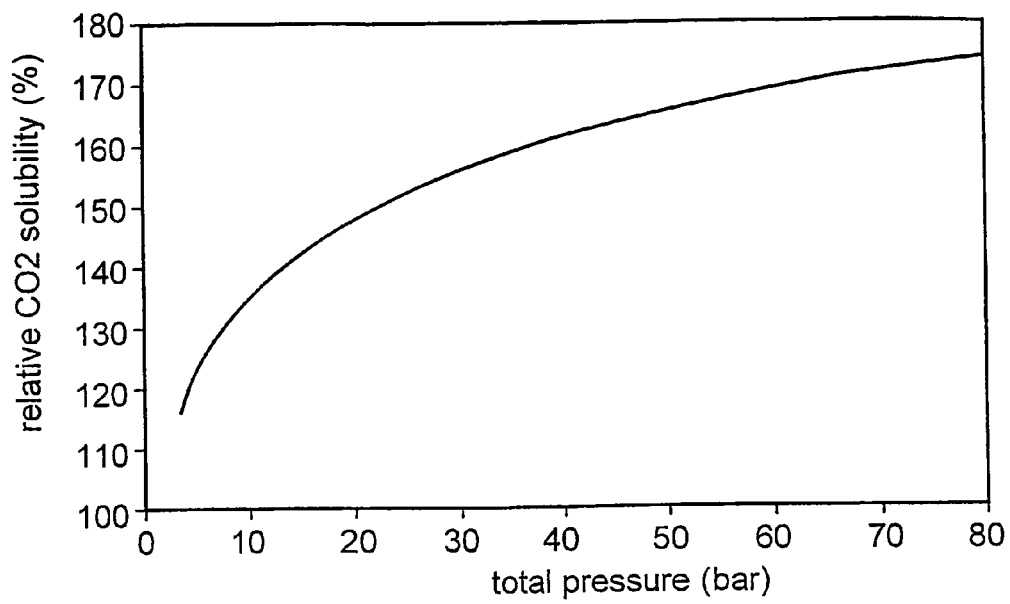
FIG. 2 shows a diagram on the relative $CO_2$ loading of an inventive scrubbing liquid in equilibrium with a gas containing 10% by volume of $CO_2$ as a function of total pressure.

Instead of the single-stage absorption device described here, a two-stage variant can also be used, as depicted, for example, in FIG. 2 of U.S. Pat. No. 4,336,233.

The acid-gas-containing scrubbing liquid leaves the absorption column 11 via a line 17 and passes via an optional expansion turbine 18 and a line 19 to the overhead region of a first expansion column 20. In the expansion column 20 the pressure of the scrubbing liquid is suddenly decreased so that the lighter components of the gas to be purified can vaporize from the scrubbing liquid. These components can be burnt or recirculated to absorption column 11. The scrubbing liquid leaves the first expansion column 20 via a line 21 at the bottom of the column, while the vaporized components of the gas to be purified are taken off via a line 22 at the top of the expansion column 20.

In the example shown the scrubbing liquid then passes into a second expansion column 23, which can be constructed, for example, as low-pressure column (that is to say low-pressure flash). Less volatile acid gases evaporate off, after passage through optionally present back-wash trays 24, via the line 25. At the top of the second expansion column 23, a heat exchanger equipped with overhead divider or condenser 26 can be provided, which recirculates entrained droplets of the scrubbing liquid to the expansion column. The condenser 26 may be bridged via a bypass line 27. The scrubbing liquid leaves the second expansion column 23 via a line 28 and is pumped via a pump 29 through a heat exchanger 30 where it takes up heat from the regenerated scrubbing liquid recirculated to the absorption column 11. The scrubbing liquid then passes into the overhead region of a stripping column 32 in which the scrubbing liquid is passed in countercurrent to a gas stream, for example steam. In the stripping column 32, residual acid gas constituents are removed from the scrubbing liquid. The scrubbing liquid leaves the bottom region of the stripping column 32 via a line 33, while the stripped-out acid gas constituents are recirculated via a line 34 into the bottom region of the second expansion-column 23. The scrubbing liquid flowing away via the line 33 passes to a distributor 35 at which a portion of the scrubbing liquid is transported by a line 36 to a reboiler 38 which heats the liquid and recirculates it as vapor via a line 39 into the stripping tube. Another portion of the scrubbing liquid passes from the distributor 35 via the line 37 to a pump 40 which, as indicated diagrammatically via the transfer path 41, is connected to the expansion turbine 18. The expansion turbine supplies a portion of the energy required to drive the pump 40. Via a line 42 the regenerated scrubbing liquid low in acid gases passes into the heat exchanger 30, where it transfers heat to the scrubbing liquid passed through the line 28 into the stripping column 32. The regenerated scrubbing liquid is then recirculated via the lines 43 and 13 to the absorption column 11, where it can again absorb acid gases. Before entry into the absorption column a further heat exchanger 44 can be provided, which cools the scrubbing liquid to the desired inlet temperature. Also, filters and other purification devices (which are not shown) can be provided, in order to purify the scrubbing liquid before its entry into the absorption column 11.

In the region of the lines 43,13, feed lines (which are not shown) for fresh scrubbing liquid can also be provided, if the required feed rate cannot be maintained solely by regenerated scrubbing liquid.

The influent scrubbing liquid rate can be regulated by the output of the pumps and by valve and throttling devices (which are not shown).

Advantages of the invention are described in more detail below with reference to comparative examples.

EXAMPLES

1. $CO_2$ Equilibrium Concentration

Calculations were carried out using a phase equilibrium model (Pitzer model; Kenneth S. Pitzer, Activity Coefficients in Electrolyte Solutions $2^{nd}$ ed., CRC-Press, 1991, Chapt. 3, Ion Interaction Approach:Theory and Data Correlation; the model parameters were adapted to phase equilibrium measurements). An aqueous absorption medium was used as a basis which contains 5% by weight of piperazine, 35% by weight of DIMAP and 60% by weight of water. FIG. 2 shows the relative $CO_2$ concentration (in the figure indicated as "rel. $CO_2$ solubility") of this absorption medium as a function of the total pressure in equilibrium of a gas which contains 10% by volume $CO_2$. The $CO_2$ concentration of the inventive scrubbing liquid is related to the $CO_2$ equilibrium concentration, at a total pressure of 1 bar, of a comparison scrubbing liquid which contains 40% by weight of DIMAP and 60% by weight of water. The inventive scrubbing liquid, for total pressures greater than 2 bar, has a higher $CO_2$ solubility which exceeds 1.7 times that of the comparison at the highest indicated total pressure.

2. $H_2S$ Equilibrium Concentration

The $H_2S$ equilibrium concentration was determined in a similar manner to that of $CO_2$ in accordance with Example 1.

In turn an aqueous absorption medium was used as a base which contains 5% by weight of piperazine, 35% by weight of DMAP and 60% by weight of water.

Figure 3:
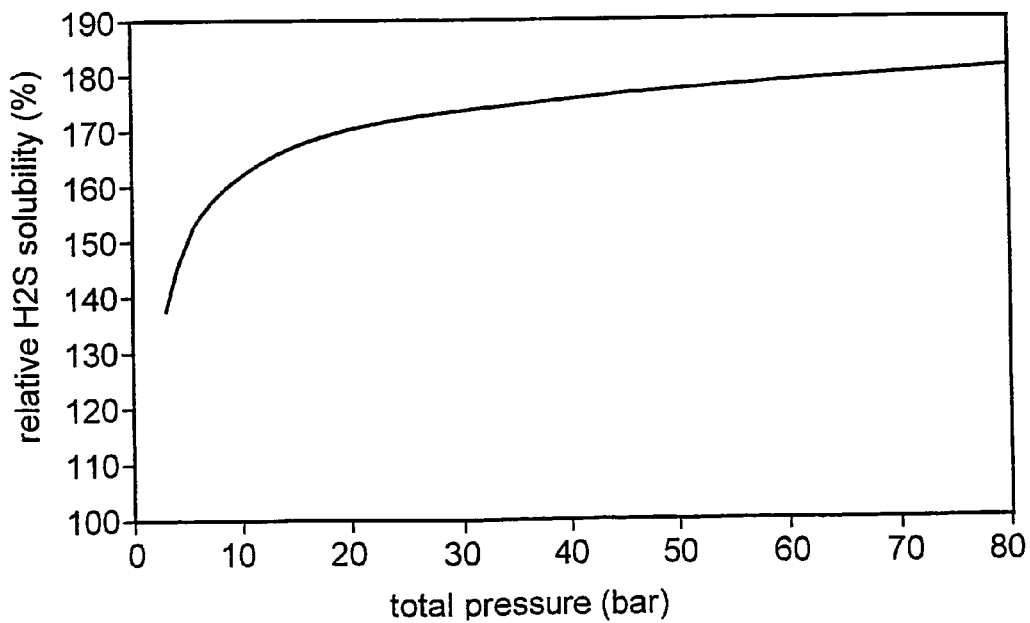
FIG. 3 shows a diagram on the relative $H_2S$ loading of an inventive scrubbing liquid in equilibrium with a gas containing 5% by volume $H_2S$ as a function of total pressure.

FIG. 3 shows the relative $H_2S$ concentration ("rel. $H_2S$ solubility") of the inventive scrubbing liquid as a function of the total pressure in equilibrium with a gas which contains 5% by volume $H_2S$. The concentration is related to the $H_2S$ equilibrium concentration of a comparison scrubbing liquid which contains 40% by weight of DMAP and 60% by weight of water at a total pressure of 1 bar. The inventive scrubbing liquid, for pressures >2 bar, has a higher $H_2S$ solubility which, at the highest reported total pressure, reaches roughly 1.8 times that of the comparison.

2. Simultaneous $CO_2/H_2S$ Concentration

The concentrations were determined in a similar manner to that of $CO_2$ in accordance with Example 1.

Table 1, for two gases having differing acid gas contents at different total pressures shows the equilibrium concentration of an inventive scrubbing liquid containing 5% by weight piperazine, 35% by weight DMAP and 60% by weight of water, relative to the equilibrium concentration of a scrubbing solution containing 5% by weight piperazine, 35% by weight MDEA and 60% by weight water. As can be seen, both the $CO_2$ and also the $H_2S$ concentrations are increased.

TABLE 1

| Total pressure/ bar | $CO_2$ content/ % by volume | $H_2S$ content/ % by volume | Relative $CO_2$ concentration/% | Relative $H_2S$ concentration/% |
|---|---|---|---|---|
| 8 | 15 | 5 | 182 | 152 |
| 15 | 5 | 5 | 188 | 161 |

We claim:

1. A process for deacidifying a fluid stream comprising an acid gas as an impurity, comprising:

intimately contacting the fluid stream with a scrubbing liquid, separating a fluid stream substantially free of the acid gas from a scrubbing liquid laden with acid gas, wherein the scrubbing liquid is an aqueous solution comprising:

a) from 3 to 60% by weight 3-dimethylamino-1-propanol and b) from 0.1 to 50% by weight piperazine, and said contacting is performed at a total pressure of 2 bar or higher.

2. The process as claimed in claim 1, further comprising:

regenerating the scrubbing liquid laden with acid gas to form a regenerated scrubbing liquid; and then recirculating the regenerated scrubbing liquid to said intimately contacting step.

3. The process as claimed in claim 2, wherein said regenerating comprises single- or multistage expansion.

4. The process as claimed in claim 2, wherein said regenerating comprises stripping the scrubbing liquid laden with acid gas with an inert fluid.

5. The process as claimed in claim 1, wherein said contacting step is carried out in a plurality of sequential substeps, said substeps comprising contacting the acid-gas-containing fluid stream with a substream of the scrubbing liquid in each of the substeps.

6. The process as claimed in claim 5, wherein the scrubbing liquid substreams are produced after respective sequential substeps of the regeneration process of the scrubbing liquid, wherein the scrubbing liquid substreams have a decreasing loading of acid gas.

7. The process as claimed in claim 1, wherein said aqueous solution further comprises a physical absorption medium for acid gas.

8. The process as claimed in claim 7, wherein said physical absorption medium is at least one selected from the group consisting of sulfolane, an aliphatic acid amide, N-methylpyrolidone and methanol.

9. The process as claimed in claim 7, wherein the concentration of the physical absorption medium is less than or equal to 20% based on the weight of the scrubbing liquid.

10. The process as claimed in claim 1, wherein the concentration of 3-dimethylamino-1-propanol, based on the scrubbing solution, is from 10 to 60% by weight.

11. The process as claimed in claim 1, wherein the concentration of piperazine, based on the scrubbing solution, is from 0.02 to 50% by weight.

12. The process as claimed in claim 7, wherein the concentration of 3-dimethylamino-1-propanol, based on the scrubbing solution, is from 10 to 60% by weight.

13. The process as claimed in claim 7, wherein the concentration of piperazine, based on the scrubbing solution, is from 0.02 to 50% by weight.

14. The process of claim 1, wherein said fluid stream comprising an acid gas as an impurity is selected from the group consisting of natural gas, synthesis gas, heavy oil, refinery gas, a liquefied hydrocarbon stream and reaction gas resulting from the partial oxidation of organic materials.

15. The process of claim 1, wherein said contacting is performed at a total pressure of 5 to 100 bar.

* * * * *